United States Patent
DiFalco

(10) Patent No.: US 7,316,016 B2
(45) Date of Patent: *Jan. 1, 2008

(54) HOMOGENEOUS MONITORING OF HETEROGENEOUS NODES

(75) Inventor: Robert A. DiFalco, Portland, OR (US)

(73) Assignee: Tripwire, Inc., Portland, OR (US)

( * ) Notice: Subject to any disclaimer, the term of this patent is extended or adjusted under 35 U.S.C. 154(b) by 683 days.

This patent is subject to a terminal disclaimer.

(21) Appl. No.: 10/188,430

(22) Filed: Jul. 3, 2002

(65) Prior Publication Data

US 2004/0006614 A1    Jan. 8, 2004

(51) Int. Cl.
- G06F 9/46 (2006.01)
- G06F 15/173 (2006.01)
- G06F 11/00 (2006.01)
- G06F 17/00 (2006.01)

(52) U.S. Cl. .................. 718/102; 709/223; 709/224; 709/232; 709/242; 714/43; 706/45

(58) Field of Classification Search ........ 709/208–226, 709/232, 242; 713/310; 714/22, 30, 37, 714/43–47; 718/100–108; 370/254, 244; 706/45; 715/733

See application file for complete search history.

(56) References Cited

U.S. PATENT DOCUMENTS

| | | | | |
|---|---|---|---|---|
| 5,063,523 A | * | 11/1991 | Vrenjak .................. 709/223 |
| 5,542,047 A | * | 7/1996 | Armstrong .................. 709/224 |
| 5,745,669 A | * | 4/1998 | Hugard et al. .................. 714/3 |
| 5,764,913 A | * | 6/1998 | Jancke et al. .................. 709/224 |
| 5,778,184 A | * | 7/1998 | Brownmiller et al. ...... 709/224 |
| 5,845,062 A | * | 12/1998 | Branton et al. ................ 714/25 |
| 5,913,036 A | * | 6/1999 | Brownmiller et al. ...... 709/224 |
| 6,041,347 A | * | 3/2000 | Harsham et al. ............ 709/220 |
| 6,052,722 A | * | 4/2000 | Taghadoss .................. 709/223 |
| 6,072,777 A | * | 6/2000 | Bencheck et al. .......... 370/244 |
| 6,122,664 A | * | 9/2000 | Boukobza et al. .......... 709/224 |
| 6,125,390 A | * | 9/2000 | Touboul ..................... 709/223 |
| 6,144,993 A | * | 11/2000 | Fukunaga et al. .......... 709/208 |
| 6,222,827 B1 | * | 4/2001 | Grant et al. ................. 370/254 |
| 6,253,339 B1 | * | 6/2001 | Tse et al. ..................... 714/47 |
| 6,272,537 B1 | * | 8/2001 | Kekic et al. ................ 709/223 |
| 6,356,885 B2 | * | 3/2002 | Ross et al. .................... 706/45 |

(Continued)

OTHER PUBLICATIONS

Derbort et al., "Conversion of a Rule Based to an Object Oriented Expert System", 1991, IEEE, pp. 751-754.*

(Continued)

*Primary Examiner*—Meng-Al T. An
*Assistant Examiner*—Jennifer N. To
(74) *Attorney, Agent, or Firm*—Schwabe, Williamson & Wyatt

(57) ABSTRACT

A distributed and scalable architecture is described to facilitate reactive detection of operational state changes in diverse, heterogeneous objects, logging of detected state-changes, and generating alerts in response to detected state-changes for the purpose of remediation. Such heterogeneous objects include but are not limited to stand-alone workstations, network appliances, files and directories, as well as embedded micro-systems such as digital assistants, cellular devices, and even remotely controlled peripherals such as environmental sensors, effectors and actuators. In one embodiment, user interaction with such diverse objects is facilitated through a homogeneous user-interface metaphor through which, the rules of interaction remain constant independent of the object being monitored.

14 Claims, 15 Drawing Sheets

U.S. PATENT DOCUMENTS

| | | | |
|---|---|---|---|
| 6,393,386 B1* | 5/2002 | Zager et al. | 703/25 |
| 6,393,474 B1* | 5/2002 | Eichert et al. | 709/223 |
| 6,493,755 B1* | 12/2002 | Hansen et al. | 709/224 |
| 6,664,978 B1* | 12/2003 | Kekic et al. | 715/733 |
| 6,751,661 B1* | 6/2004 | Geddes | 709/223 |
| 6,983,317 B1* | 1/2006 | Bishop et al. | 709/223 |
| 7,016,888 B2* | 3/2006 | Slemmer et al. | 709/223 |
| 7,039,698 B2* | 5/2006 | Slemmer et al. | 709/223 |
| 7,082,554 B2* | 7/2006 | Wilson et al. | 714/43 |
| 7,159,036 B2* | 1/2007 | Hinchliffe et al. | 709/242 |
| 7,228,460 B2* | 6/2007 | Pomaranski et al. | 714/43 |
| 2001/0044840 A1* | 11/2001 | Carleton | 709/223 |
| 2001/0052010 A1* | 12/2001 | Kim | 709/224 |
| 2002/0188711 A1* | 12/2002 | Meyer et al. | 709/223 |
| 2003/0110280 A1* | 6/2003 | Hinchliffe et al. | 709/232 |
| 2003/0172151 A1* | 9/2003 | Schade | 709/224 |
| 2003/0217134 A1* | 11/2003 | Fontoura et al. | 709/223 |
| 2004/0068562 A1* | 4/2004 | Tilton et al. | 709/225 |
| 2004/0205182 A1* | 10/2004 | Geddes | 709/223 |

OTHER PUBLICATIONS

Kerschberg et al., "Intelligent Network Management: A Heterogeneous Knowledge Source Approach", 1990, IEEE, pp. 314-316.*

* cited by examiner

HOMOGENEOUS MONITORING OF HETEROGENEOUS NODES

BACKGROUND OF THE INVENTION

1. Field of the Invention

The invention relates to the field of change management. More specifically, the invention relates to scalable, distributed monitoring and remediation of heterogeneous objects and devices.

2. Background Information

With the proliferation of networked devices such as computers, digital assistants, wireless phones and so forth, and the ubiquitous access afforded to these devices by networks such as the Internet, even the most protected data can be vulnerable to harm. Whether the harm is due to damage caused by a virus, an unauthorized access, or simply due to natural occurrences such as exposure to the elements, the importance of data integrity and security monitoring cannot be overstated.

Conventional integrity and security monitoring systems focus on the monitoring of state changes within homogenous devices or nodes. That is, conventional monitoring systems are capable of interfacing (and by extension) monitoring only similarly formed devices. For example, a typical monitoring application provided by a router manufacturer may only be capable of monitoring one or more of a family of router products produced by the manufacturer. Unfortunately, these prior art systems do not address monitoring state changes within a large number of heterogeneous devices typically encountered in today's networks.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

Figure 1:
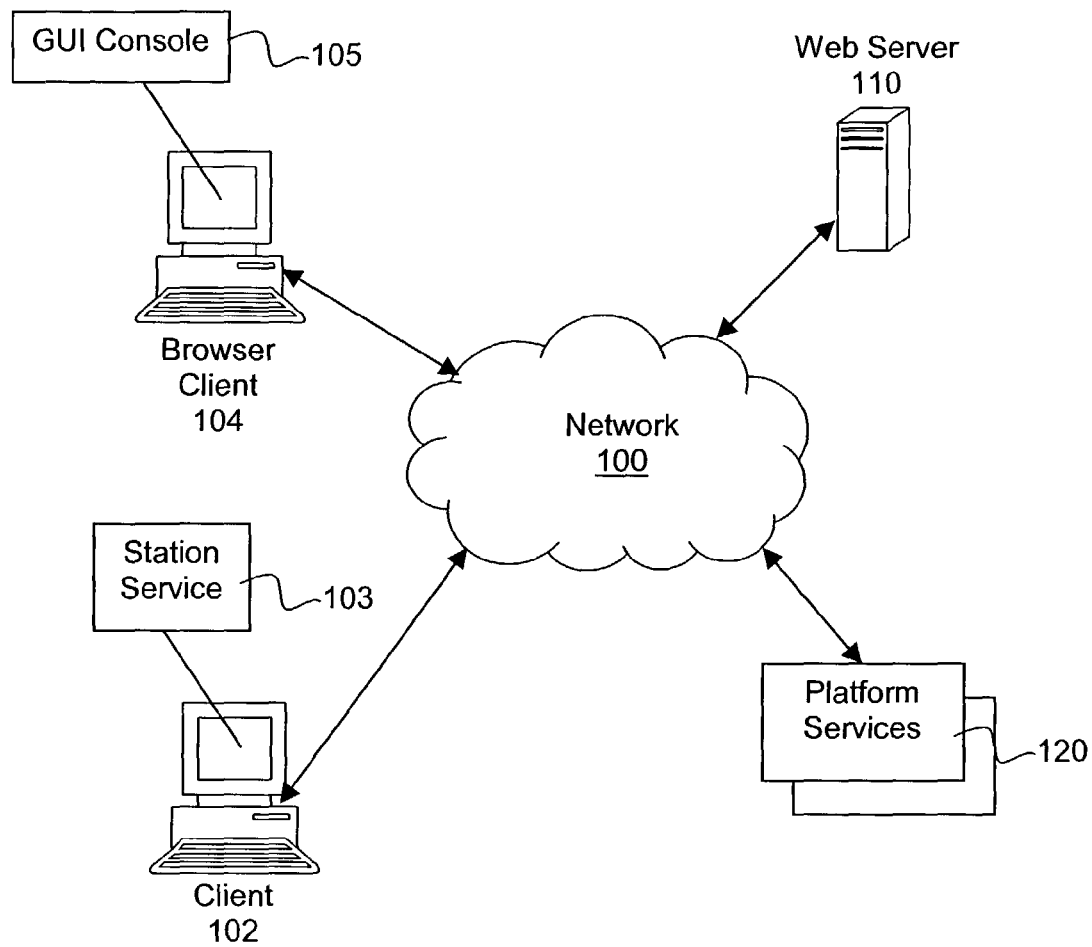
FIG. 1 illustrates an overview of the present invention in accordance with one embodiment.

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well-known features are omitted or simplified in order not to obscure the present invention.

Parts of the description will be presented in terms of operations performed by a processor based device, using terms such as data, storing, selecting, determining, generating, and the like, consistent with the manner commonly employed by those skilled in the art to convey the substance of their work to others skilled in the art. As well understood by those skilled in the art, the quantities take the form of electrical, magnetic, or optical signals capable of being stored, transferred, combined, and otherwise manipulated through mechanical and electrical components of the processor based device; and the term processor include microprocessors, micro-controllers, digital signal processors, and the like, that are standalone, adjunct or embedded.

Various operations will be described as multiple discrete steps in turn, in a manner that is most helpful in understanding the present invention. However, the order of description should not be construed as to imply that these operations are necessarily order dependent. In particular, these operations need not be performed in the order of presentation. Further, the description repeatedly uses the phrase "in one embodiment", which ordinarily does not refer to the same embodiment, although it may.

Overview

The present invention includes a distributed and scalable architecture to facilitate reactive detection of operational state changes in diverse, heterogeneous objects. Such heterogeneous objects include but are not limited to stand-alone workstations, network appliances, files and directories, as well as embedded micro-systems such as digital assistants, cellular devices, and even remotely controlled peripherals such as environmental sensors, effectors and actuators. User interaction with such diverse objects is facilitated through a homogeneous user-interface metaphor through which, the rules of interaction remain constant independent of whether the user is monitoring e.g. a security door sensor or a file system object.

Operationally, the architecture described herein facilitates detection of state-changes in monitored objects, logging of detected state-changes, and alerting users of detected state-changes for the purpose of remediation. In one embodiment, a state change is detected whenever a monitored object deviates from its authoritative state. The authoritative state represents an object's baseline operation. A user may respond to a state change, for example, by updating the baseline with the deviated state or restoring the object to its baseline state. As will be described in further detail below, the objects used to model these and other operations include rules, nodes, groups, responses, and scheduled tasks.

Rules contain the criteria used for detecting state-changes and enable a user to define what objects are monitored and how, but not the actual location where the detection should occur. This enables the same rule to be applied to multiple locations or nodes on a network. For example, a rule for a file system object may stipulate that an MD5 hash be generated in association with the file object, and compared against a baseline MD5 hash known to exits for the file object. If a deviation is detected, a state-change can be logged. In one embodiment, rules are user-defined through a homogeneous graphical user interface (GUI).

Where rules define what objects are monitored and how they are monitored, nodes identify where a rule should run. Different rules may be targeted against different types of nodes. For example, a rule that states the criteria for a router configuration check may target a router node, while a rule that detects changes to files may target a workstation node. Nodes may be of an active type or a passive type. An active node is one that provides an execution context and can act upon itself, whereas a passive node is one that is acted on remotely by an active node. For example, if a node is hosting station services (described below), it is considered an active node and e.g. can detect file-integrity state changes locally as determined a file integrity rule scheduled to run on the node. If the node does not host the station services it is considered a passive node causing such file-integrity checks to be performed by an active node that has remote access to the file(s) being checked. A device such as a router will typically be a passive node since it cannot run installed software locally. In one embodiment, nodes are user-defined through a homogeneous graphical user interface.

Rules and nodes can be arranged into logical groups, which may themselves include other rule and node subgroups. In one embodiment of the invention, a user can create logical groupings of rules and nodes in any organizational way that makes sense to the user. The rule and node groups can be used in the system in the same way their individual contents can, which allows rules and nodes to be defined once and to be hierarchically arranged thereafter if so desired. In one embodiment, logical rule and node groupings are user-defined through a homogeneous GUI.

Responses define what action should be taken in response to a detected state-change. Different responses may be appropriate for different rule/node combinations. Generally, responses fall into the categories of remediation and alert. For example, a remedying response may update the baseline that is used to detect state-changes or restore an object to its baseline state, whereas alert responses may send an email alert or throw an SNMP trap when a state change is detected. In addition, responses can be setup to execute automatically when a state-change is detected or to execute manually through user-interaction.

Scheduling defines the frequency with which rules will run to detect state changes on nodes. A task essentially defines the rules to run, the nodes those rules should run for (i.e. be asserted against), and the frequency with which rule and node pairs should be run. A task can schedule a rule or rule-group to run for a node or node-group. In one embodiment, if a node group is scheduled against a rule group, a product of each group is taken to form individual node/rule pairings. In one embodiment, tasks are synthesized based upon user input (e.g. rule and node groupings) received via a GUI.

FIG. 1 illustrates an overview of the present invention in accordance with one embodiment. In FIG. 1, clients 102 and 104, and web server 110 are communicatively coupled together through network 100 as shown. Network 100 represents one or more local and/or global networks such as, but not limited to the Internet, through which data is exchanged in accordance with one or more data communication and/or telecommunication protocols. Web server 110 represents a computing device equipped to generate client interfaces in accordance with the teachings of the present invention. In one embodiment, web server 110 is equipped with SSL, Java Server Pages (JSP) and Servlet support to serve web pages, scripts, applets and style sheets to form the user interface of e.g. console 105. In accordance with one embodiment of the present invention, the JSP/servlet engine of web server 110 contains a shared instance of a data model, which provides the information necessary to generate the actual user interface content including instances of nodes, rules, violations, and so forth. Moreover, the data model facilitates the execution of commands designed to create nodes, execute rule assertions, schedule tasks, and so forth.

Client 104 represents a device such as, but not limited to a desktop/laptop computer, set-top box, network appliance, PDA, wireless phone, and so forth equipped with a browser client such as Internet Explorer or Netscape to facilitate the provision of GUI console 105 to a user. GUI console 105 provides the basic user-interface tools for working with rules, nodes, scheduled tasks, detected state changes, user-security, and system status. In one embodiment GUI console 105 is implemented as a web-based GUI, whereas in another embodiment GUI console 105 is implemented as a standalone application.

Client 102 represents a device such as those mentioned above with respect to client 104, that executes station service 103. Station service 103 is responsible for processing rules according to their associated schedule(s). In one embodiment, each node that requires local processing (e.g., based upon the hardware and software configuration of the node) executes its own instance of the station service, thereby becoming an active node. Nodes not executing the station service are considered to be passive nodes.

Platform services 120 provide the core architecture implementation of the present invention in that they facilitate management and retrieval of system objects, execution of tasks, and the provision of system security. In one embodiment, platform services 120 are distributed for execution by multiple devices coupled to network 100.

Platform Services

Figure 2:
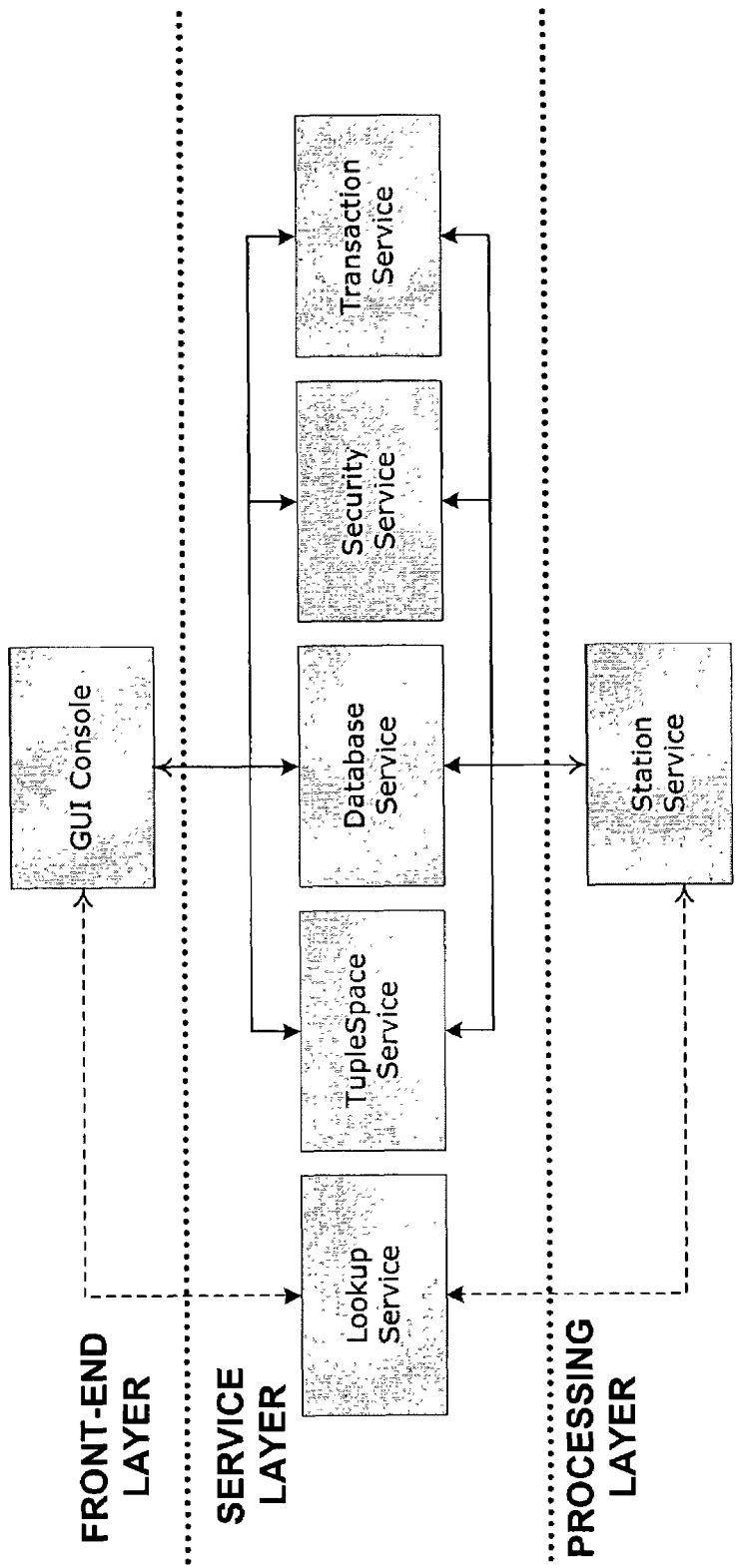
FIG. 2 illustrates an architectural overview of one embodiment of the present invention including various ones of platform services and their respective interactions.

FIG. 2 illustrates an architectural overview of one embodiment of the present invention including various ones of platform services 120 and their respective interactions. In the illustrated embodiment, the platform architecture of the present invention includes a front-end layer, a service layer, and a processing layer configured as shown.

The front-end layer comprises a model layer (not shown) and a user interface layer and is primarily responsible for providing a user interface to facilitate data entry and management by a user. The model layer (hereinafter referred to model) provides a layer of abstraction between the core processing logic and the different user interface implementations. In one embodiment this is accomplished through an application programming interface (API) that provides access to a number of diverse lower level structures and protocols. In one embodiment, the model encapsulates all of the complex details of creating, editing, and retrieving system objects so that the user interface implementations can be as thin and simple as possible. Since the model hides most of the system's complexity, it becomes very easy to provide multiple user interface implementations (e.g. a stand alone application, web based application, or command line). The model is discussed in further detail in copending U.S. patent application Ser. No. 10/209,818, entitled "METHOD FOR PROVISIONING DISTRIBUTED WEB APPLICATIONS ", which is hereby fully incorporated by reference.

The user interface layer includes a console that provides the basic user interface tools for working with rules, nodes, scheduled tasks, detected state changes, user security, system status, and so forth. In one embodiment, the console is implemented as a thick client via e.g., Java, whereas in another embodiment, the console is implemented as a web based console that can be managed via a Java-enabled web browser.

The service layer is composed of the basic services such as a lookup service, a tuple-space service, a database service, a security service, and a transaction service. Each service can reside on a distinct processor and each is able to discover those services it depends on through e.g. dynamic discovery. Accordingly, the location of any service can change without regard to other services that may be using it. In one embodiment, each processor running a service also runs a small activation daemon, which monitors services running on the local host and restarts them if any have been brought down.

The lookup service is responsible for dynamic discovery and as such, periodically broadcasts announcements to the rest of the system announcing its location on the network. When a platform service is started, it listens for these announcements and responds by registering its name and location with the lookup service. The lookup service keeps this registry available to all processes that need to find a specific platform service.

The security service includes user security and licensing and is responsible for the overall platform security. In one embodiment, user security is accomplished with users, roles, and permissions, where roles are hierarchical allowing permissions and other roles to be grouped together, and where permissions are checked against the policies implemented by the security service.

The database service contains centralized persistent data for the platform and its data model. The database service provides a means for storing and filtered-retrieval of persistent data used by the system. In one embodiment, the database service utilizes a relational database model that facilitates management of long-lived data. Such data may include, but is not limited to, log entries, detected state-changes, and information regarding the hierarchical structure of node and rule groupings.

Like the database service, the tuple-space service is also a data-oriented service, but the tuple-space service contains objects rather than relational data. In one embodiment, tuple-space is used to centrally deploy components and will look for newly defined rules.

The processing layer is composed of a single service called the station service. The station service is primarily responsible for finding low-level tasks known as actors (e.g. rules) and executing/asserting them. The station service continually asks the tuple-space service for actors whose destination identity matches the node (or host) identity of the station. When a match is found, the station service removes the actor from the tuple-space and executes it. This actor can be anything from an object that deploys new components on that station's host to a task that has been scheduled for execution on that station.

Front-End Console

Figure 3:
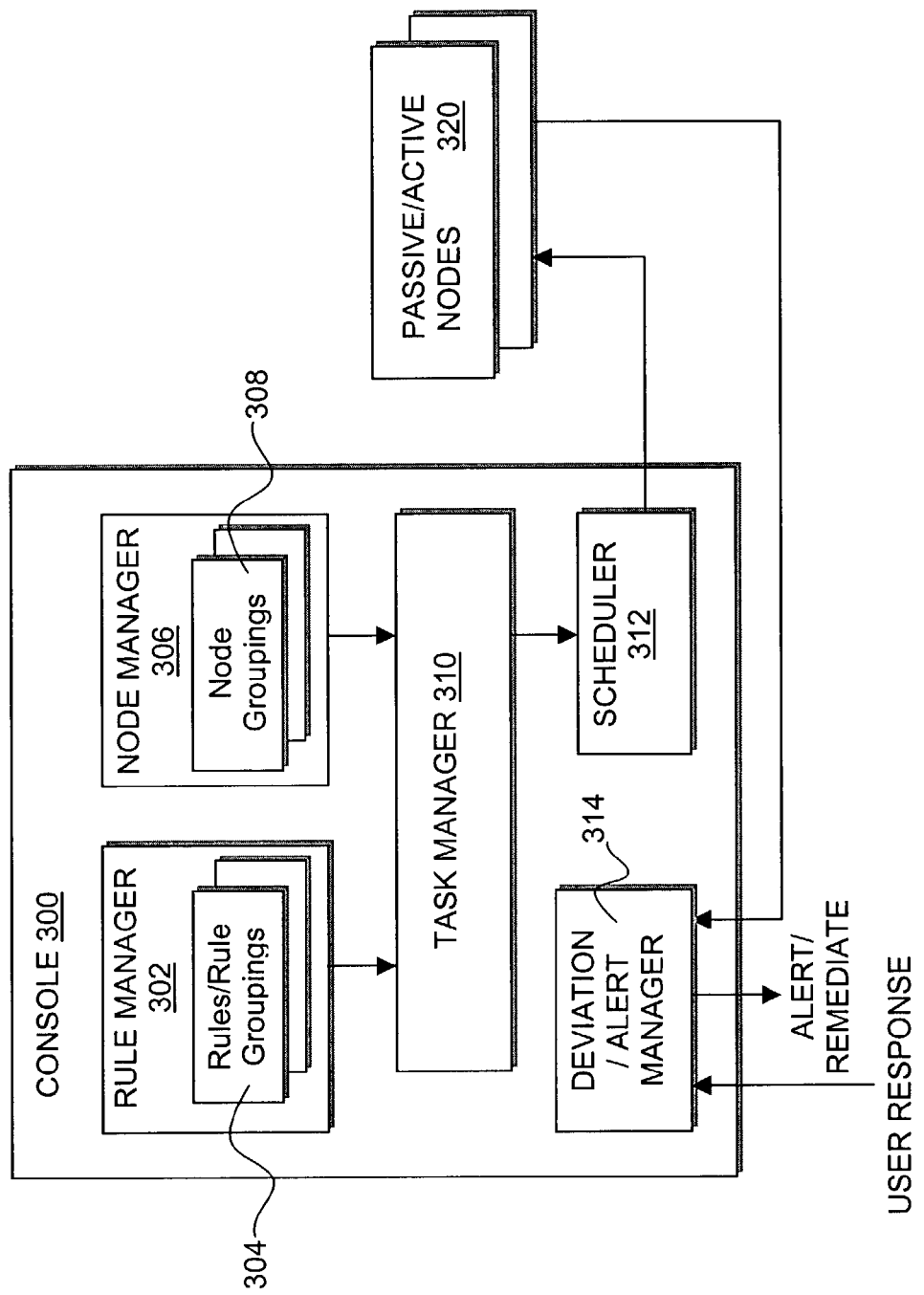
FIG. 3 is a block diagram illustrating various components of the front-end console in accordance with one embodiment of the invention.

FIG. 3 is a block diagram illustrating various components of the front-end console in accordance with one embodiment of the invention. As shown, console 300 includes rule manager component 302, node manager component 306, task manager component 310, scheduler component 312 and deviation/alert manager component 314.

Rule manager 302 facilitates the definition and management of rules including evidence patterns, evidence assertions, and evidence responses. The term evidence refers to the source of raw information that an evidence-type uses to realize an evidence record and is described in more detail with respect to FIG. 10. Common sources of evidence include, but are not limited to file objects, raw network packets, operating system audit logs, application audit logs, system-generated checksum data, and so forth. In accordance with the teachings of the present invention, evidence is analyzed to form a diagnosis of misuse, intrusion, integrity violation, or some other security misbehavior. In one embodiment, evidence is represented as one or more tuples. Through rule manager 302, a user can define one or more logical rule groupings, 304.

Node manager 306 facilitates the specification and management of both passive and active nodes 320. As was mentioned above, nodes identify where a rule should be run. That is, nodes identify one or more resources against which one or more rules or rule groups should be asserted. Through node manager 306 a user specifies a variety of node-specific data so as to generate a logical representation of that node. The logical node representations may then be grouped into one or more logical node groupings 308. Both node and rule groupings (308, 304) may be hierarchically organized to facilitate monitoring of operational state changes.

Once the rule and node definitions and/or groupings have been entered, one or more monitoring tasks, each indicating which rules/rule groups are to be asserted against which nodes/node groups, are defined via task manager 310. Task manager 310 synthesizes one or more discrete schedulable monitoring tasks to be performed based upon the rule/group definitions.

Scheduler 312 facilitates scheduling the frequency with which rules will run to detect state-changes on nodes. A task can schedule a rule or rule group to be asserted against a node or node group. If for example, a node group is scheduled against a rule group, a product of each group is taken to form individual node/rule pairings. In one embodiment, if the operational state of a given node does not match the evidence asserted (e.g., as defined by the rule), a state-change (i.e. deviation in operating state) is detected and deviation/alert manager 314 is notified.

Deviation/alert manager 314 handles the disposition of deviations, which result in at least one of a remediation response and an alert response as e.g. determined by the asserted rule(s). A remedying response may update the baseline that is used to detect state-changes or a restore an object to its baseline state. Alert responses may for example send an email alert or throw an SNMP trap when a state-change is detected. Responses can be setup to execute automatically when a state-change is detected or based upon manual execution. In one embodiment, a manual response can be invoked for an entry in the state-change history of an object.

Figure 4:
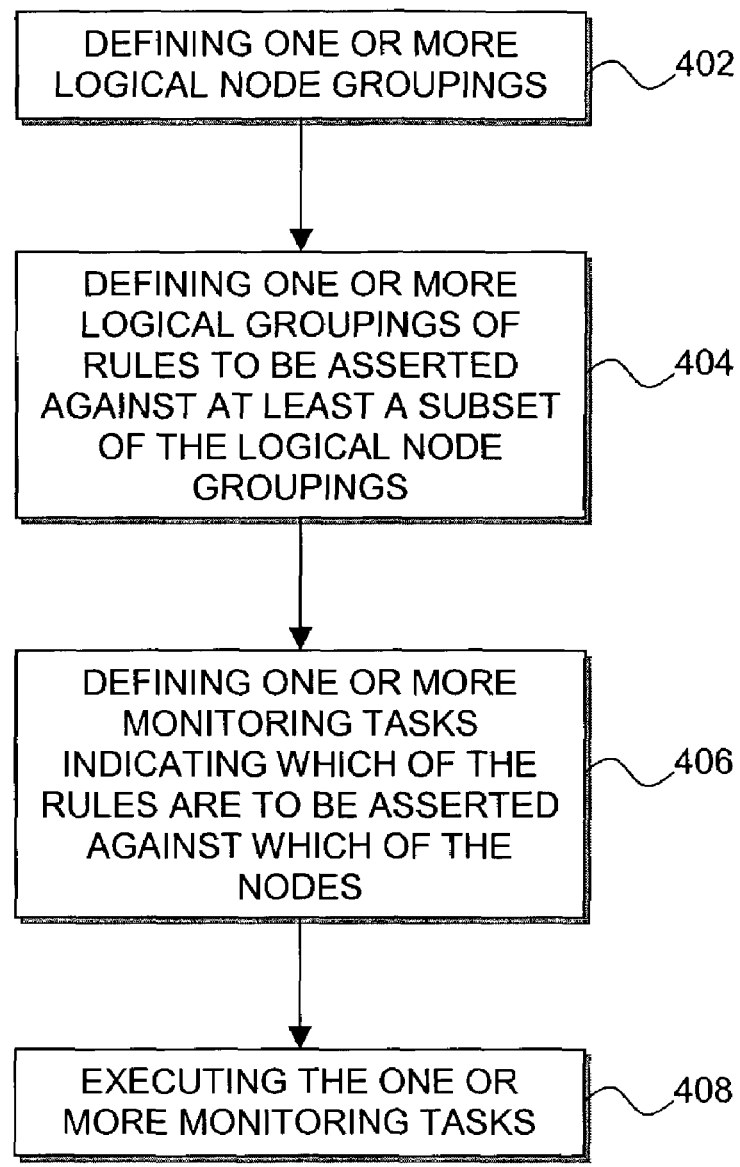
FIG. 4 is a flow diagram illustrating console operation in accordance with one embodiment of the invention.
Figure 5A:
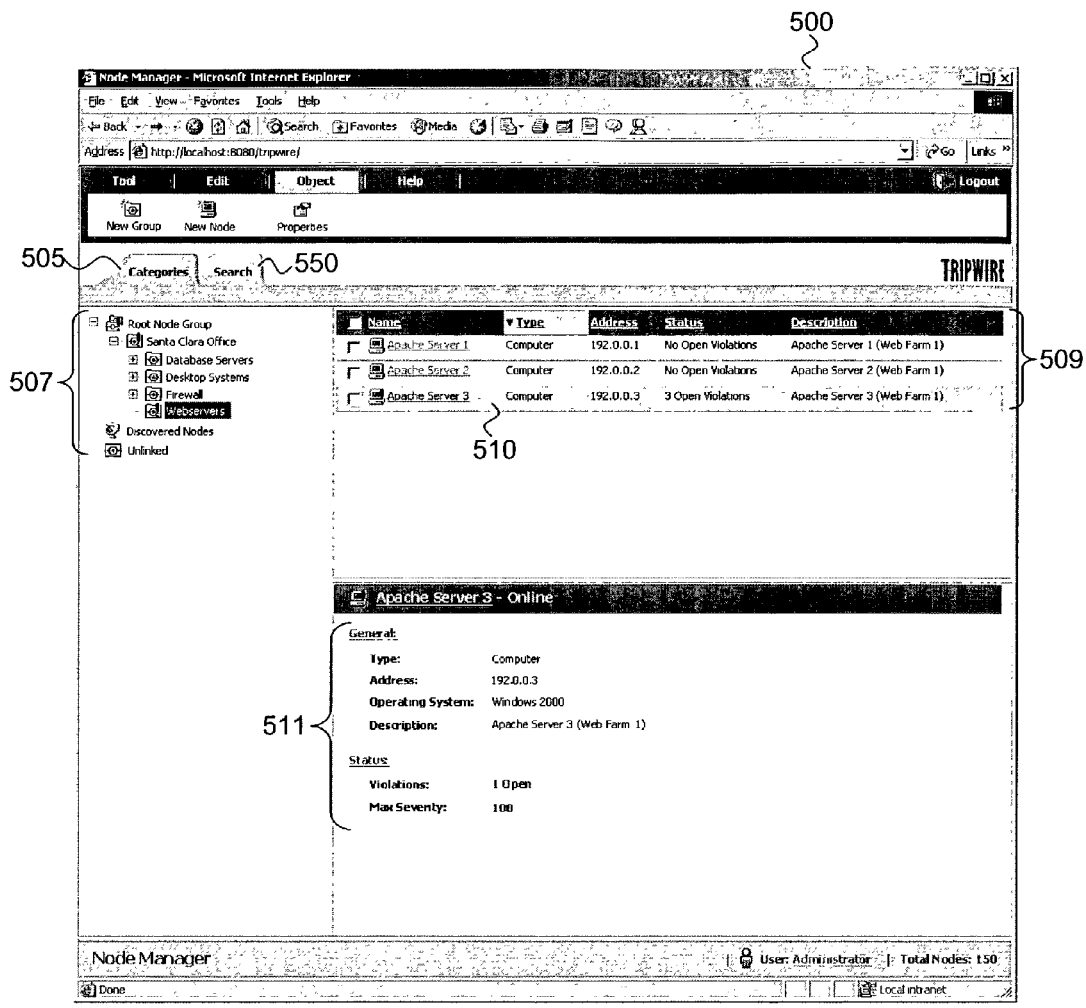
FIGS. 5-9 illustrate various graphical user interface dialogs corresponding to nodes, rule and task definition and management, in accordance with one embodiment.
Figure 5B:
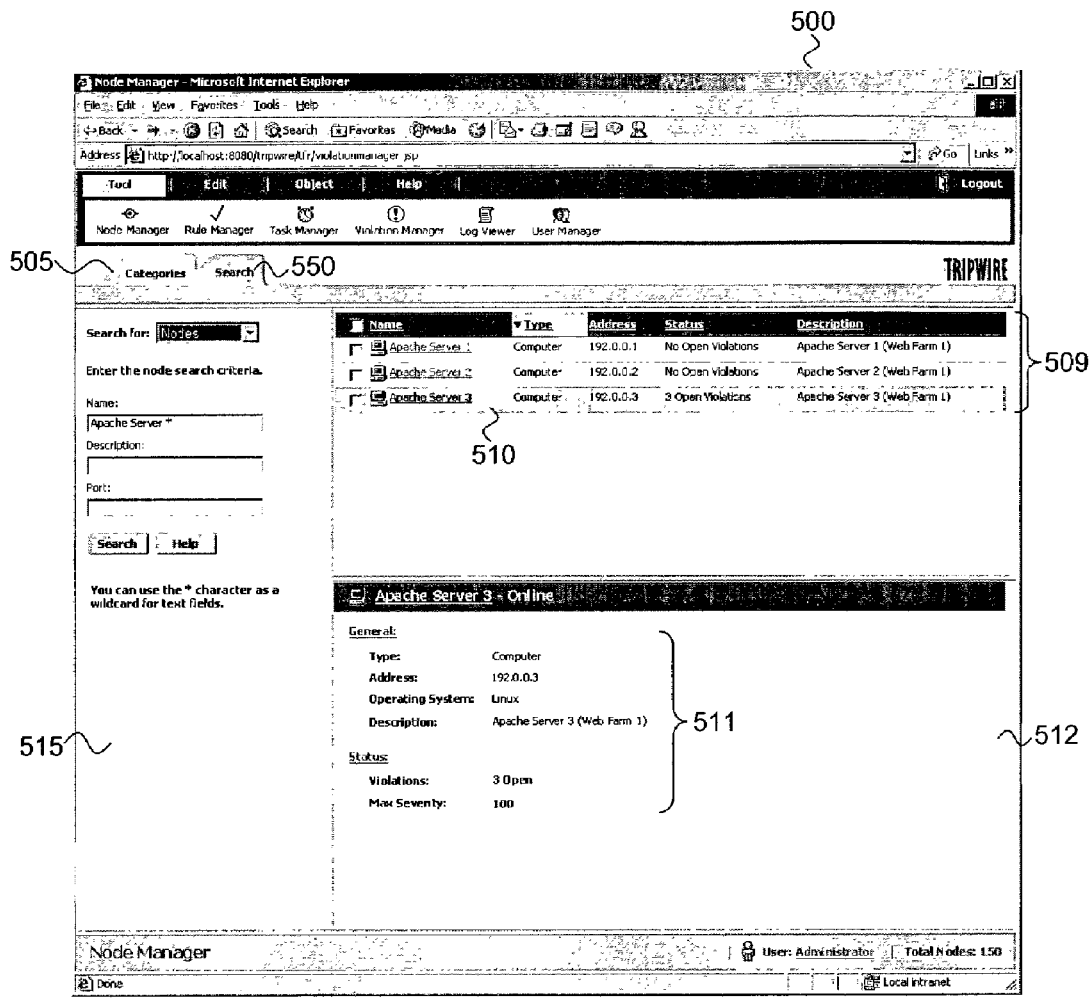

FIG. 4 is a flow diagram illustrating console operation in accordance with one embodiment of the invention. To begin, one or more logical groupings of nodes are defined (e.g. by console 300 in conjunction with user input), block 402. One or more logical groupings of rules are then defined so as to be asserted against at least a subset of the logical node groupings, block 404. Next, one or more monitoring tasks indicating which of the rules/rule groups are to be asserted against which of the nodes/node groups are defined, block 406. Lastly, the one or more monitoring tasks are executed by e.g. an evidence-monitoring agent (described below). In one embodiment, the monitoring tasks are opportunistically serviced based upon e.g. individual agent processing capabilities.

User Interface

FIGS. 5-9 illustrate various graphical user interface dialogs corresponding to nodes, rule and task definition and management. FIGS. 5a and 5b together illustrate a node manager user interface dialog in accordance with one embodiment of the invention. As shown, node manager dialog 500 includes categories tab 505 and search tab 550. Categories tab 505 is composed of node group navigation tree 507, the nodes associated with the currently selected node group displayed in node/node group table 509, and the details (511) of currently selected node 510. In one embodiment, node group tree 507 contains all of the node groups within the system. The user can navigate the node groups, and select a single node group (e.g., 510) within node/node group table 509 for which the details will be displayed. In the illustrated embodiment, node groups can be displayed along with nodes in node/node group table 509. For example, if the "Santa Clara Office" item is selected in group navigation tree 507, the "Database Servers", "Desktop Systems", "Firewall", and "Webservers" node groups would be displayed within node/node group table 509.

"Discovered Nodes" group 513 displays new nodes as they are started. For example, after the station service has been installed on a machine and started (server, workstation, etc.), the corresponding node will appear in "Discovered Nodes" group 513. The console user may then assign it a different name, provide it with a description, and move it to the appropriate node group.

Node/node group table 509 displays the nodes and node groups associated with the currently selected node group (e.g., 510) in node group tree 507. In the illustrated embodiment, each node displayed within node group tree 507 includes a "type" column, an "address" column, a "status" column, and a "description" column. The type column allows users to differentiate nodes from node groups as well as different node types. The address column displays the physical address of the node (as opposed to a logical node name or group name), while the status column identifies whether there are any open violations associated with a displayed node and the description column displays user-assignable node descriptions. It should be noted that the columns displayed may vary depending upon the nature of the nodes/node groups displayed.

Search tab 550 is composed of search pane 515, node/node group search results table 515, and node/node group details pane 512 displaying details (511) of currently selected node 510. Search pane 515 provides the ability for the user to search for nodes and node groups based upon user-supplied search criteria. While search tab 550 is active, node/node group table 509 displays the nodes or node groups resulting from the current search.

Figure 6A:
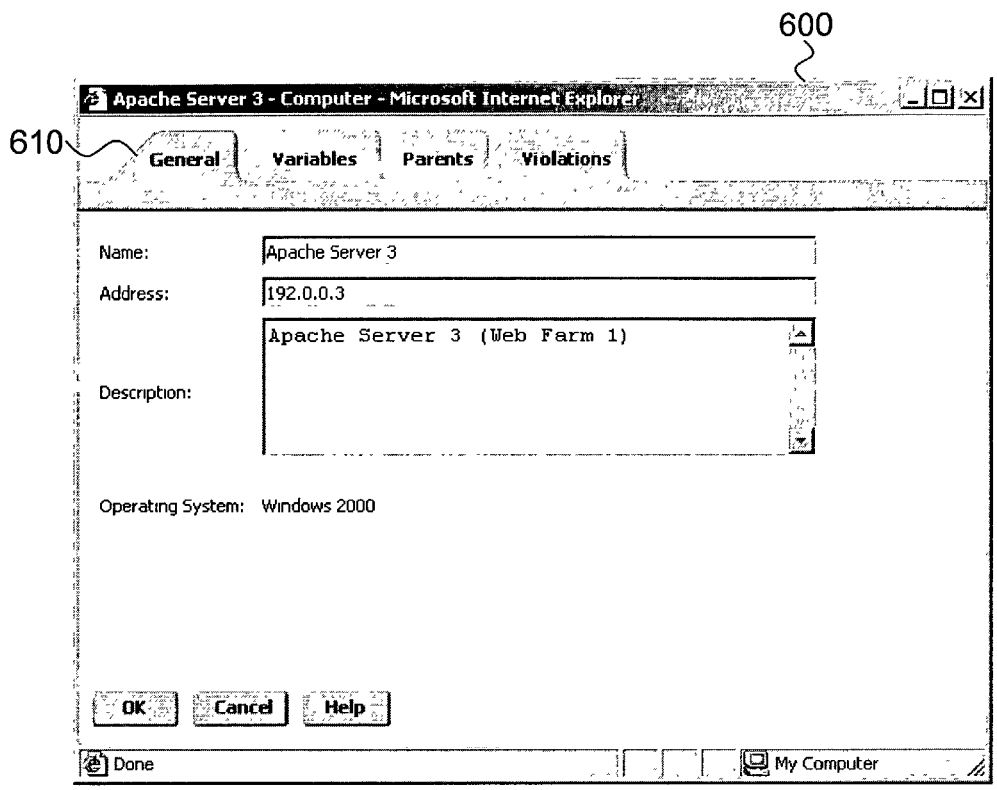

FIGS. 6a-6d illustrate various dialogs of an exemplary "computer" node property editor. In FIG. 6a, computer node property editor 600 is used to view/edit the properties of a "computer" node. In the illustrated embodiment, the "computer" node is a node that executes a station service locally and is capable of executing file/registry integrity checks. The computer node's general property sheet 610 provides the ability to edit the node's name, address, and description. The sheet also displays the operating system of the computer node.

Figure 6B:
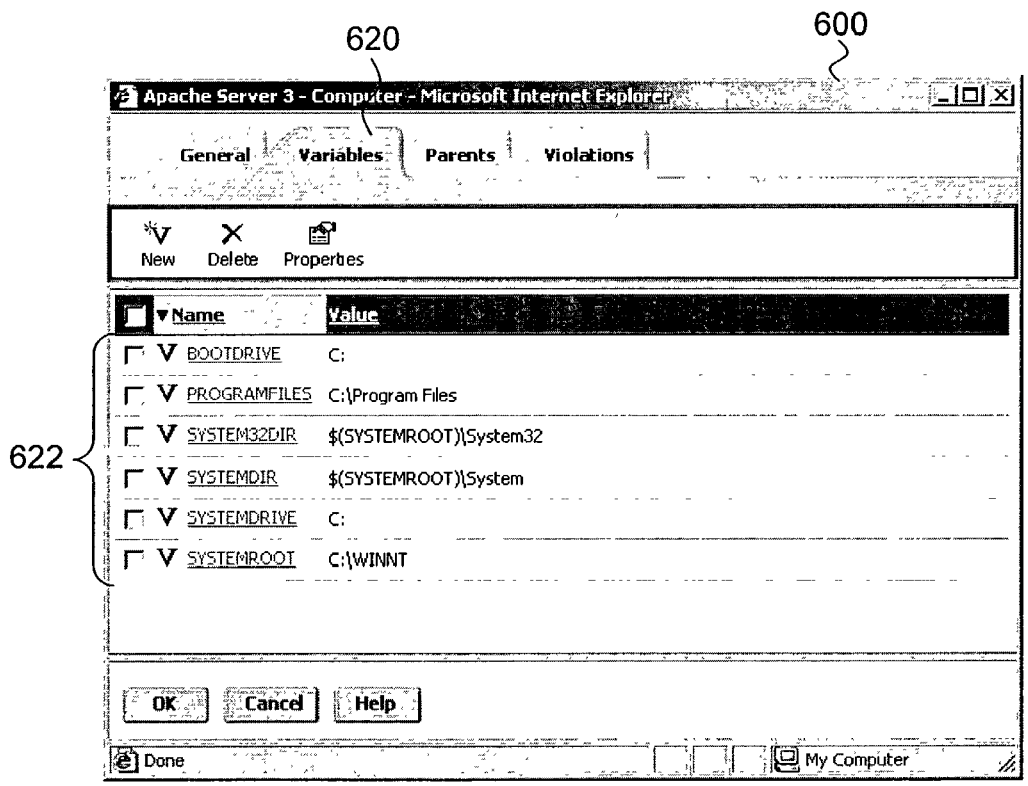

In FIG. 6b, the computer node's variables property sheet 620 provides the user the ability to view/edit computer specific properties (e.g. via variables) associated with the computer node, such as what the drive letter of the boot drive is, the default directory for a certain file type, etc.

Figure 6C:
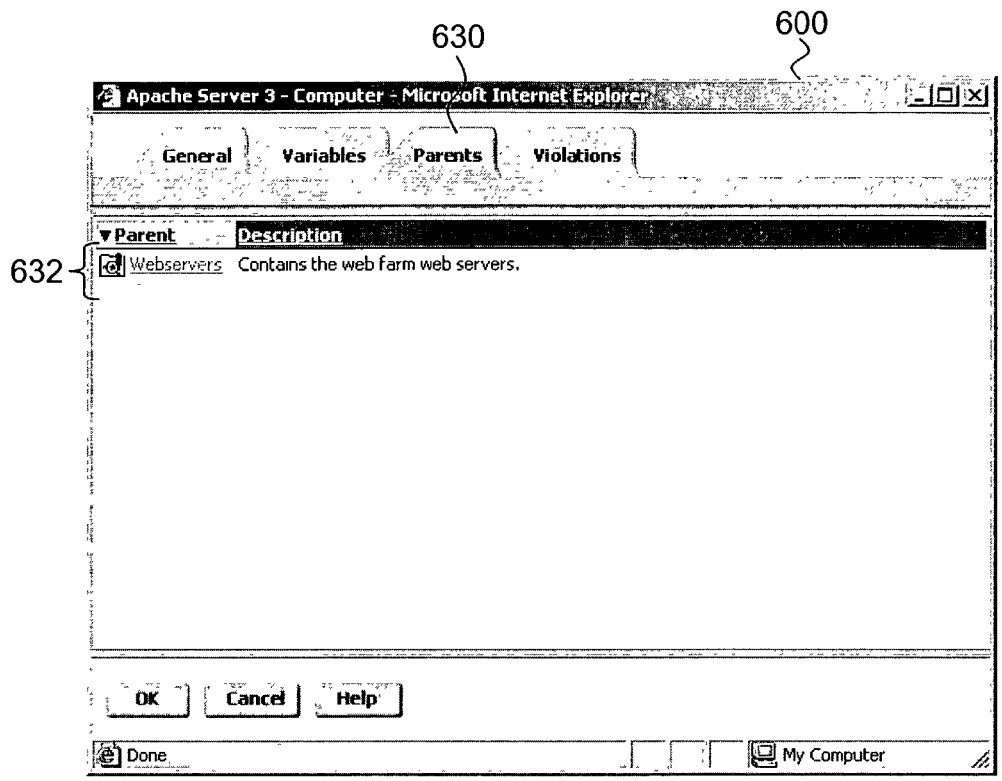
Figure 6D:
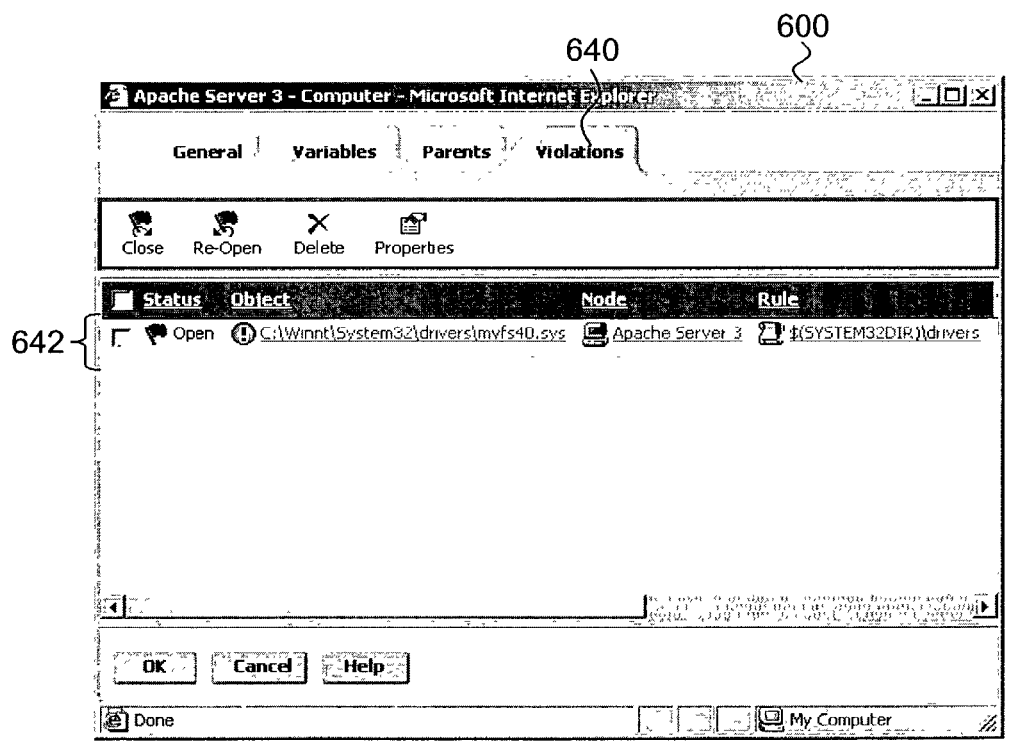

In one embodiment, file/registry integrity rules are defined such that they can be shared between multiple computers. Variables table 622 displays the name and value for all of the computer node's currently defined variables. FIG. 6c illustrates the computer node's parents property sheet 630 that displays parents table 632. Parents table 632 displays the name and description of the computer's parents (if there are any). For example, in FIG. 6c it can be seen that the computer node's parent is the node group "Webservers". FIG. 6d illustrates the violations property sheet 640. Violations property sheet 640, including violations table 642, displays all of the currently "open" (i.e. unresolved) violations for the computer node.

Figure 7:
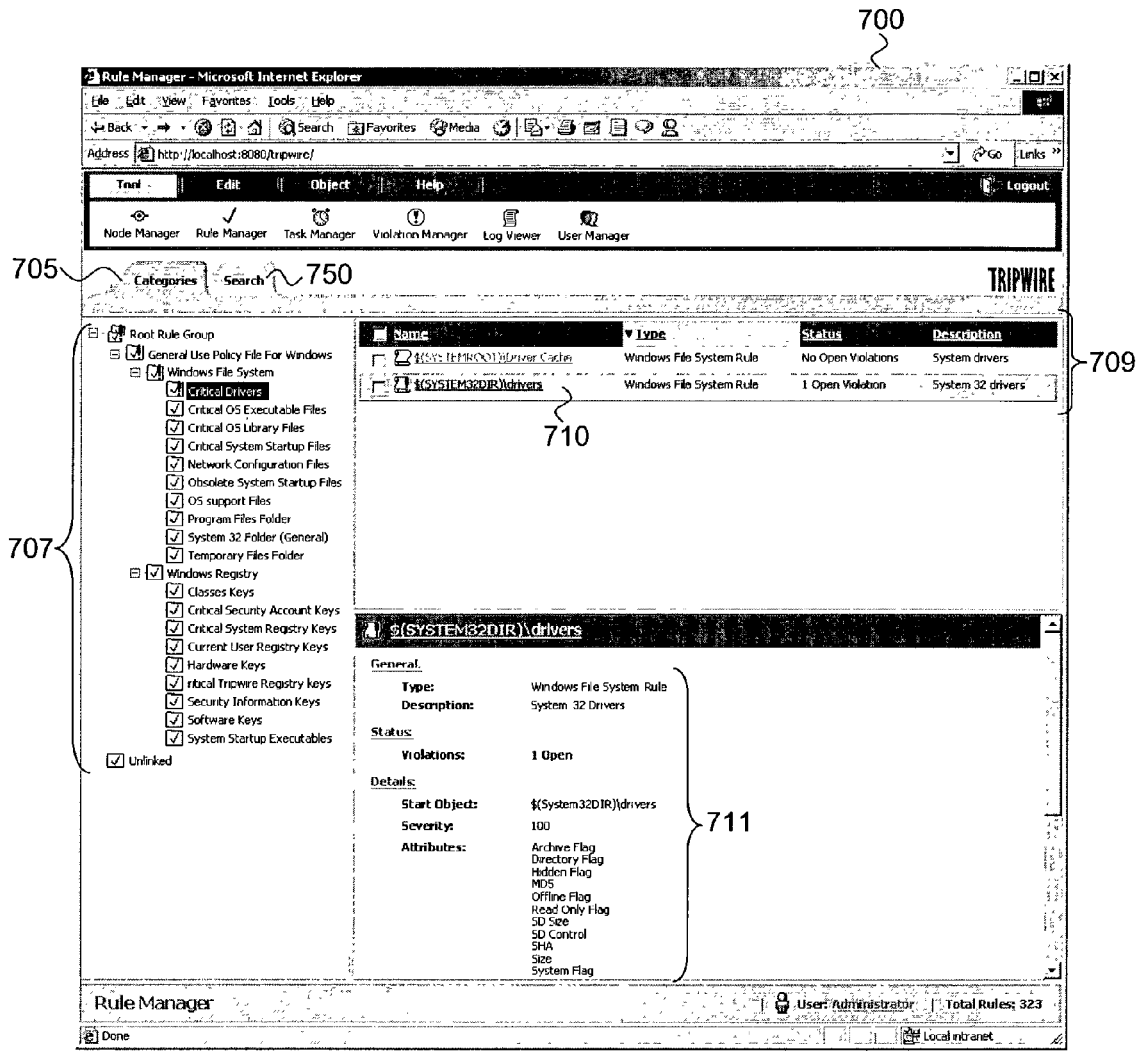
Figure 8A:
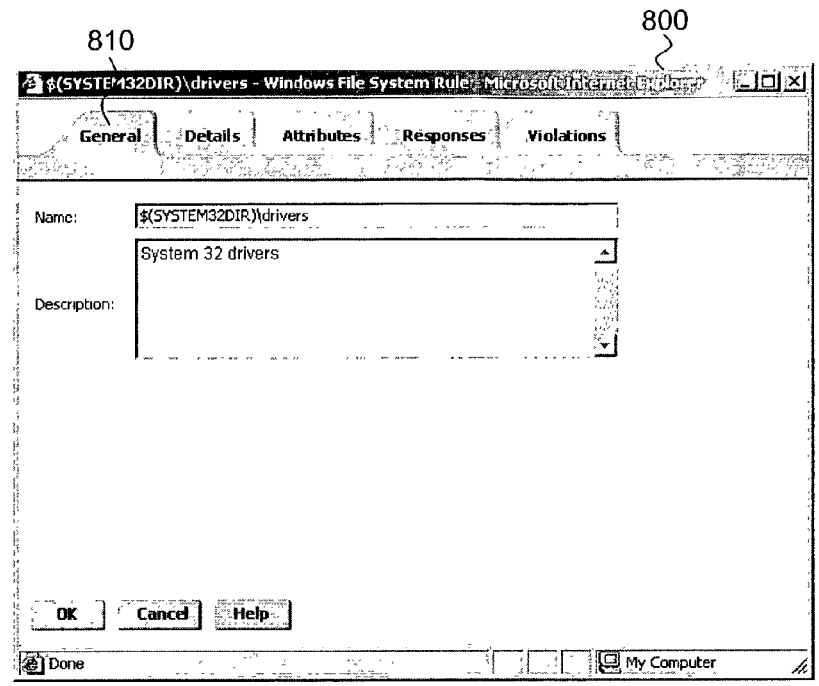
Figure 8B:
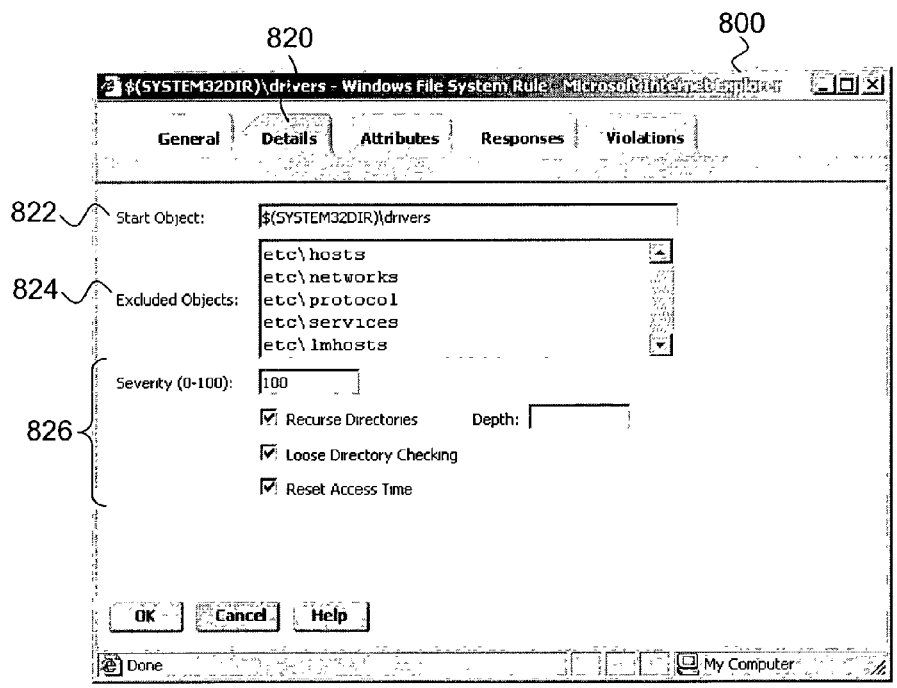
Figure 8C:
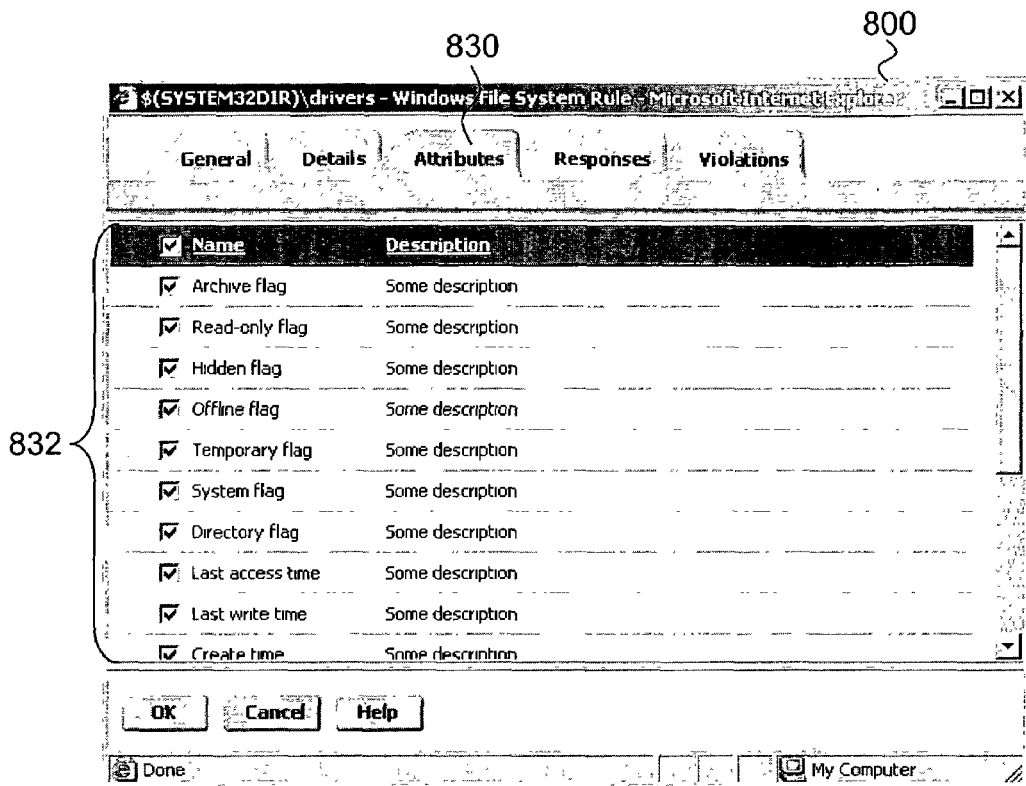
Figure 8D:
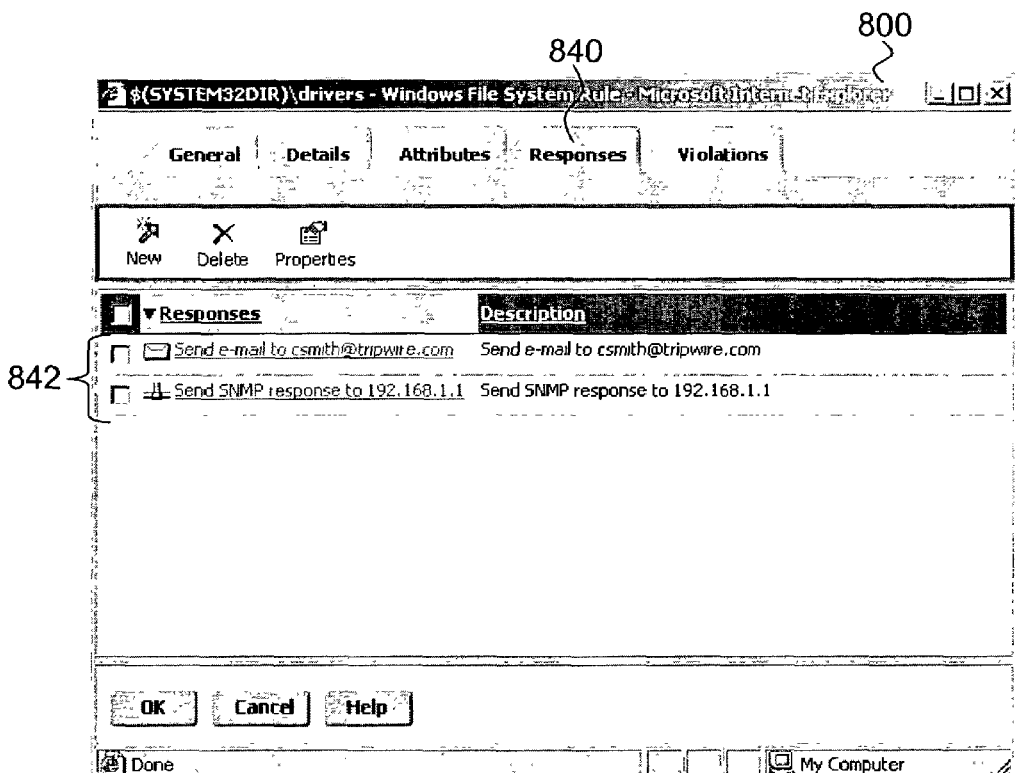
Figure 8E:
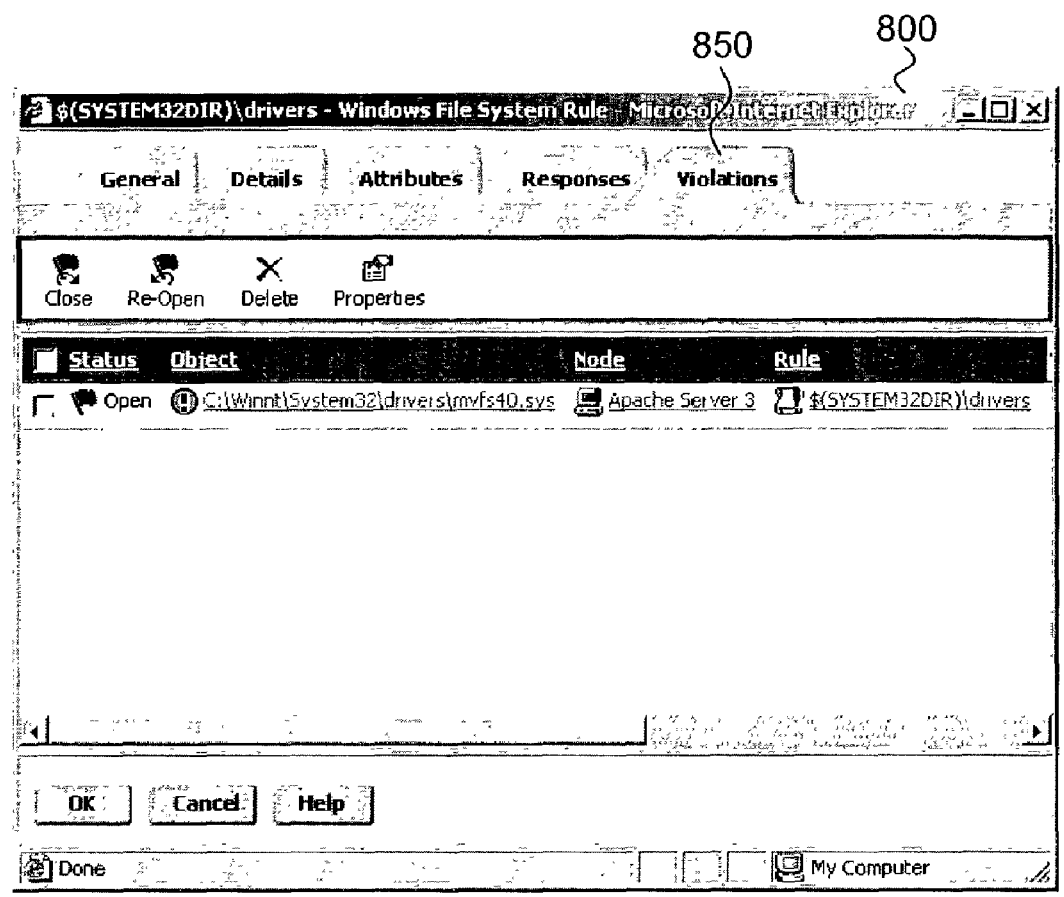

FIG. 7 illustrates one embodiment of a rule manager user interface dialog. Rule manager 700 is used to define/view/edit system rules. As shown, rule manager 700 includes categories tab 705 and search tab 750. Categories tab 705 is composed of rule group navigation tree 707, the rules associated with the currently selected rule group (713) displayed in node/node group table 709, and the details (711) of the currently selected rule (710). Rule group tree 707 contains all of the rule groups within the system. The user can navigate the rule groups, and select a single rule group for which the details will be displayed. Rule groups are displayed along with rules in rule/rule group table 709. For example, if the "Windows File System" group were to be selected in the navigation tree 707, the "Windows File System" and "Windows Registry" rule groups would be displayed in rule table 709 to the right.

FIGS. 8a-8e illustrate various dialogs of a "Windows File System" rule property editor, in accordance with one embodiment. Windows file system rule property editor 800 is used to view/edit the properties of a Windows file system rule. In accordance with the illustrated embodiment, general property sheet 810 displays the name and description of the rule, while details property sheet 820 displays the details of the file system rule. Start object 822 represents a file or a directory object to start with. In one embodiment, variables can be specified in the start object field using the "$(<variable_name>)" notation. Excluded objects 824 represent a list of files and/or directories that are excluded during the rules execution. Severity 826 represents a level of severity to be associated with the rule. Additional miscellaneous attributes (826) may also be stipulated through details sheet 820. For example, the severity to be associated with a particular rule, whether directories should be recursed during the rule's execution, and the depth of the recurse (if applicable), among others may further be stipulated. Attributes property sheet 830 displays the Windows file attributes that are to be integrity checked during the rule's execution. Attributes table 832 displays all of the available Windows file system integrity check attributes. In one embodiment, any attributes currently assigned to the rule will be checked. Attributes may be added through simple selection of the associated check box (or equivalent). Responses property sheet 840 displays responses associated with a given rule. Responses table 842 displays the responses currently associated with the selected rule. Lastly, violations property sheet 850 displays all of the currently "open" violations for a selected rule.

Figure 9:
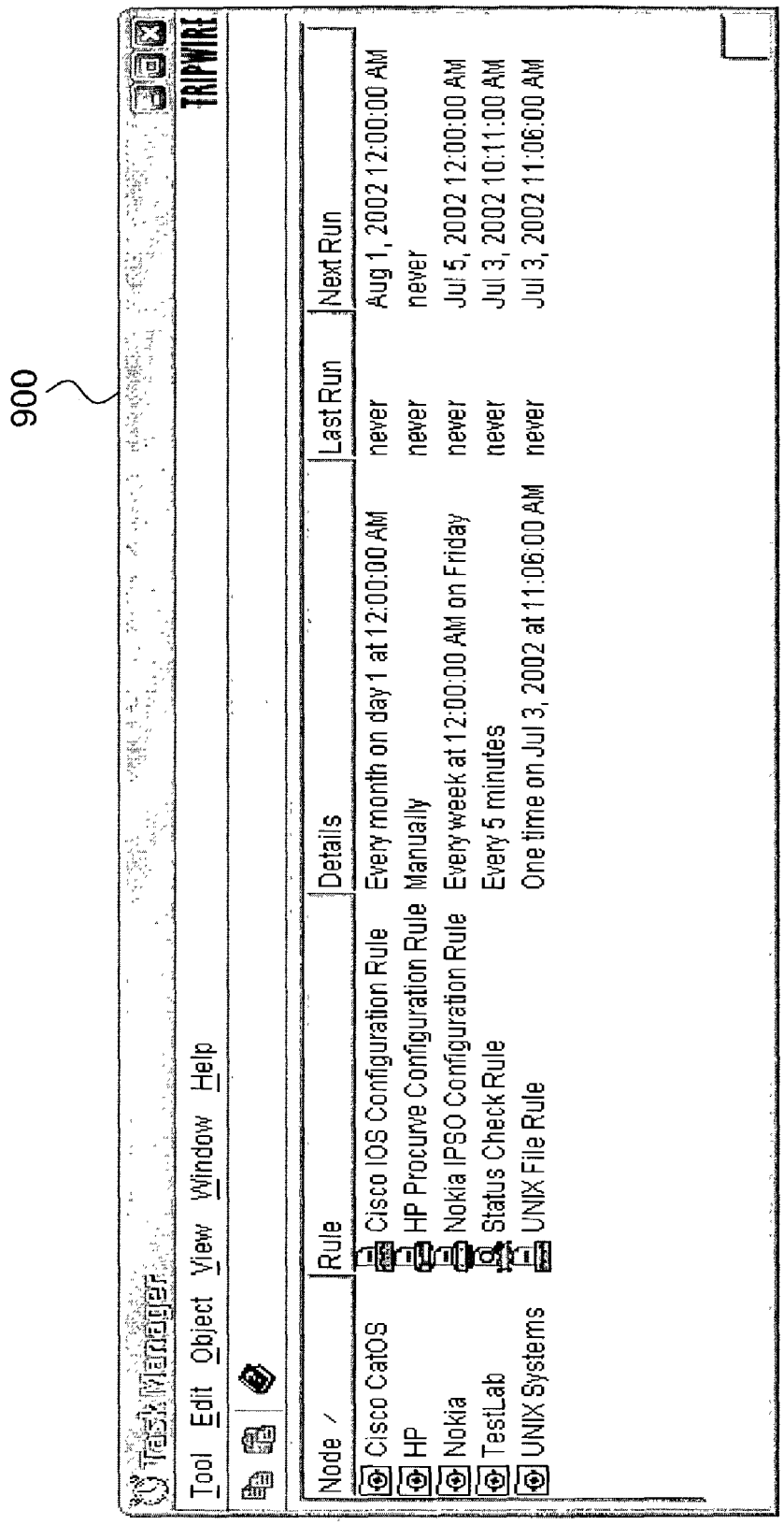

FIG. 9 illustrates one embodiment of a task manager user interface dialog. Task manager user interface dialog 900 facilitates the definition of one or more monitoring tasks by a user. As described above, monitoring tasks indicate the rules/rule groups to be asserted as well as the nodes/node groups they are to be asserted against. The task manager then synthesizes one or more discrete schedulable monitoring tasks to be performed based upon the user-provided rule/group based task definitions.

Associative Memory

The architecture of the present invention utilizes generative communications to deliver loosely coupled agents that collaborate in parallel. The generative communications model provides an associative memory to store passive and active data-structures. A passive object is any object that can exist in associative memory, while an active-object additionally provides a single point of entry (such as "run" or "main"). As such, each active object represents a thread of control. In the basic Java model for example, an active object would be an instance of any class that implements the java.lang.Runnable interface and could be launched by sending this instance as an argument to the start method of a java.lang.Thread. In one embodiment of the invention, each associative memory is implemented as a tuple-space. A tuple-space may be local, remote, transient or persistent. Each tuple-space allows disparate tasks (i.e. agents and actors) running on different threads, processes, and processors to autonomously collaborate on shared data.

Evidence Monitors and Generators

In one embodiment, the present invention includes evidence generators and evidence monitors. Each evidence generator retrieves evidence generation requests and answers these requests by generating a continuous stream of actualized (valued) evidence in associative memory using a frequency specified in the generation request. Each evidence monitor runs autonomously to evaluate actualized (generated) evidence retrieved from associative memory. In one embodiment, evidence evaluation is comprised of analyzing generated evidence with a predicate (known as an evidence assertion) and responding to failed assertions with zero or more counter-actions (i.e. responses).

Rules are actors that travel through a "generate, assert and response" work-flow. Each rule actor contains three fields, each specifying one aspect of the generate, assert and respond triad. The fields include an evidence pattern, an evidence assertion, and one or more evidence responses. Evidence patterns may be thought of as rule criteria and can be used to 1) specify the evidence to generate, and 2) specify the generated evidence to evaluate. To an evidence generator, the evidence pattern represents a request to generate evidence, while to an evidence monitor, the same evidence pattern represents a query specification used to retrieve any currently generated evidence that needs evaluation. In one embodiment, the type of the specification (e.g. whether evidence is generated based on a pattern, or whether generated evidence matching a particular pattern is retrieved) is denoted by a Boolean flag. When the flag represents true, the pattern represents a request for generated evidence. When the flag represents false, the pattern represents a request to generate evidence.

The evidence assertion field is used to evaluate generated evidence that matches the rule's evidence pattern. In one embodiment, the assertion is a unary predicate whose single argument is the value (e.g. evidence.getValue( )) of the generated evidence to assert, and returns false if the predicate failed. Each unary predicate can serve as a logic node or logic leaf allowing users to specify simple discreet assertions or complex abstract syntax trees.

Evidence responses represent a collection of action objects that should be executed when this rule's evidence-assertion returns false. The response blocks can be simple notification or complex counter-actions such as locking-down a workstation or changing the owner of a violated file in order to prevent further tampering.

Figure 10:
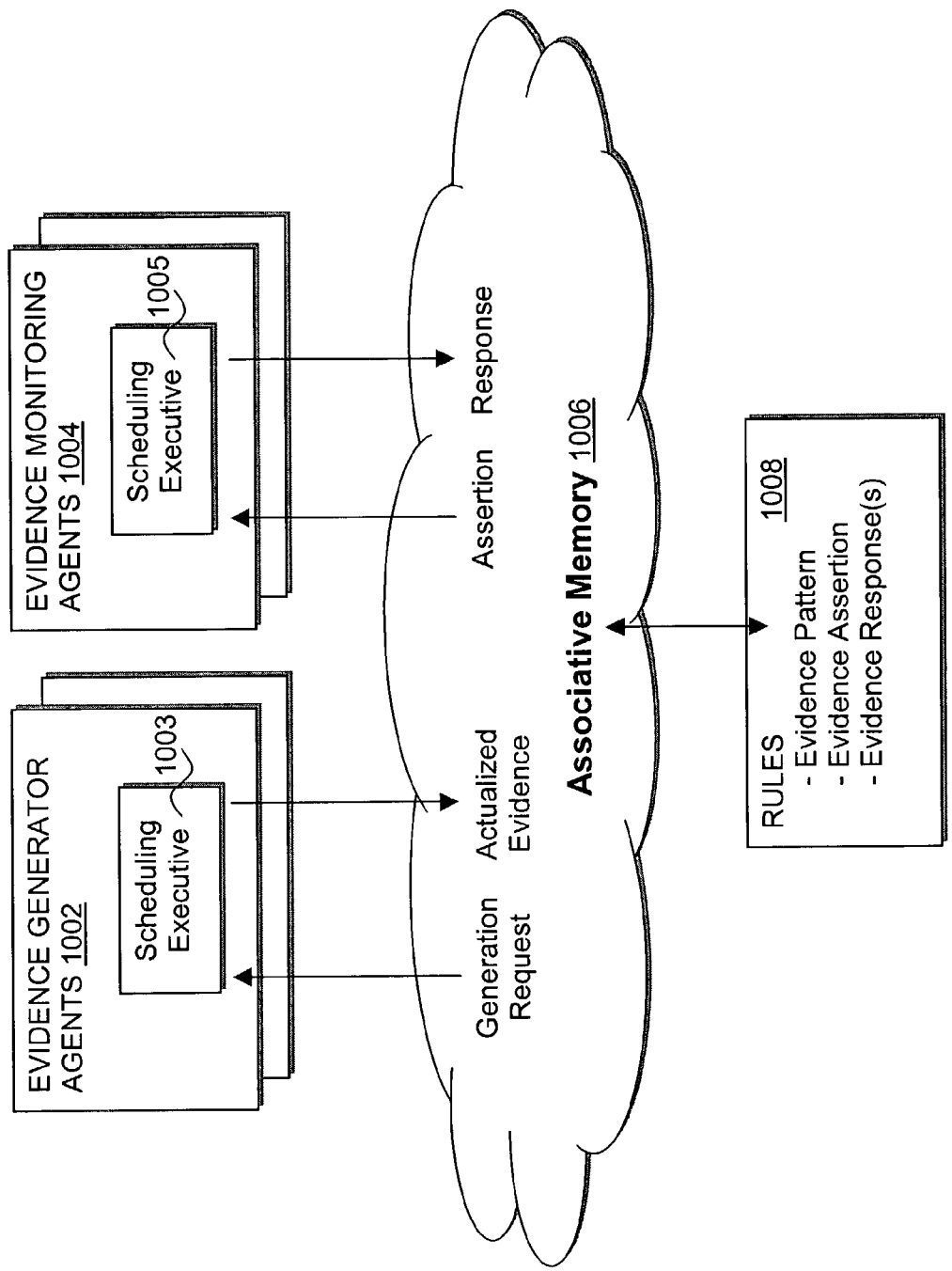
FIG. 10 illustrates one embodiment of an associative memory model including evidence generator and monitoring agents in accordance with the teachings of the present invention.

FIG. 10 illustrates one embodiment of an associative memory model including evidence generator and monitoring agents in accordance with the teachings of the present invention. As shown, evidence generator agents 1002 and evidence monitoring agents 1004 are in communication with associative memory 1006. In one embodiment, rule objects (1008) are actors that are scheduled for execution by an evidence monitor agent 1004. Since rules themselves are actors, they can directly act out their own responsibilities. In this way, an evidence monitor agent 1004 will only evaluate evidence vicariously through the rule actor it has scheduled to periodically run. When scheduled, the rule actor is sent a setup (i.e. activate) message and responds by writing its evidence pattern to any appropriate evidence generators to use as a prototype for evidence generation.

Monitoring agents 1004 and generation agents 1002 collaborate in a simple and straightforward manner as producers and consumers of associative memory. In one embodiment, as each evidence generation request arrives in associative memory 1006, exactly one evidence generator will "wake-up" and schedule the evidence generation request via scheduling executive 1003. In one embodiment, evidence generation requests are self generating and are treated as actors just like rules. As with all actors, evidence generation requests are sent a "run" method with a single argument specifying the tuple-space that it should act upon. Each evidence generation request acts by creating an actualized instance of itself and writing that instance to the specified tuplespace. This is repeatedly done using a specified frequency, which results in a steady stream of generated evidence suitable for evaluation. As mentioned above, evidence monitoring agents 1004 run autonomously to evaluate the actualized evidence with a predicate known as an assertion, and responding to failed assertions with zero or more responses.

Example Computer System

Figure 11:
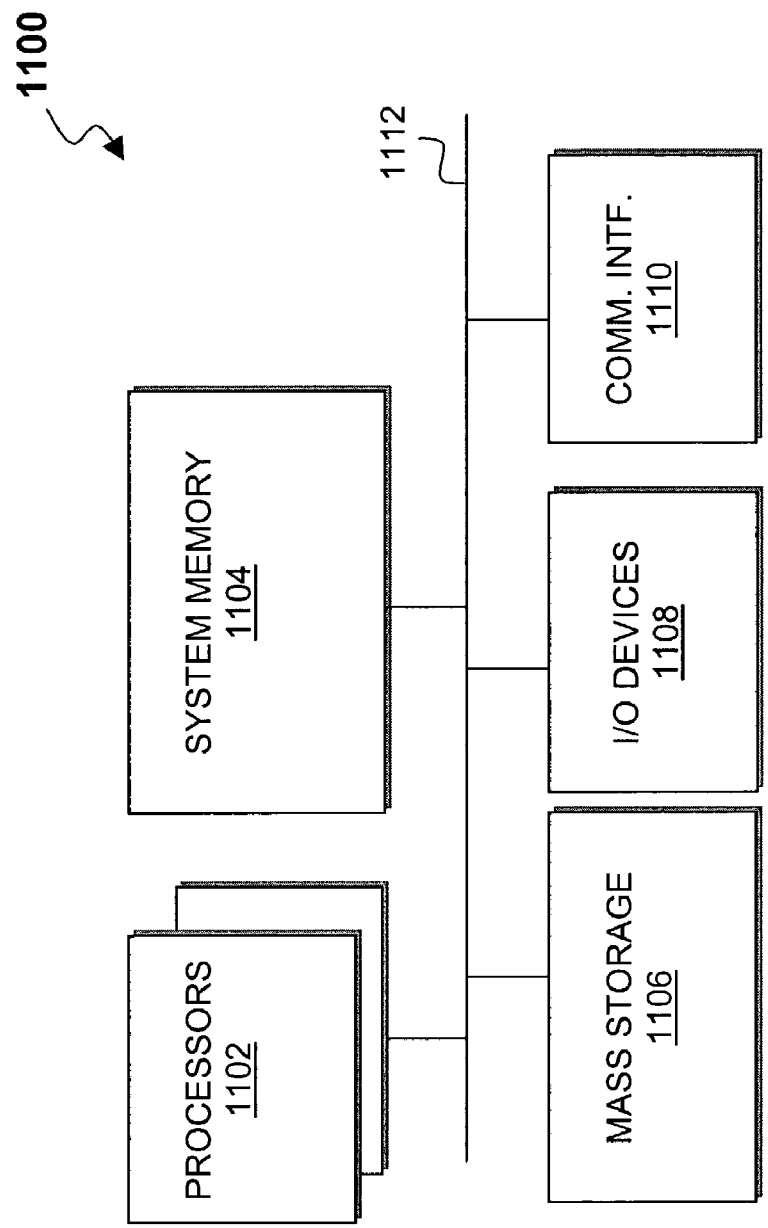
FIG. 11 illustrates an example computer system suitable for use in association with the present invention, in accordance with one embodiment.

FIG. 11 illustrates an example computer system suitable for use in association with the present invention, in accordance with one embodiment. As shown, computer system 1100 includes one or more processors 1102 and system memory 1104. Additionally, computer system 1100 includes mass storage devices 1106 (such as diskette, hard drive, CDROM and so forth), input/output devices 1108 (such as keyboard, cursor control and so forth) and communication interfaces 1110 (such as network interface cards, modems and so forth). The elements are coupled to each other via system bus 1112, which represents one or more buses. In the case where system bus 1112 represents multiple buses, they are bridged by one or more bus bridges (not shown).

Each of these elements performs its conventional functions known in the art. In particular, system memory 1104 and mass storage 1106 are employed to store a working copy and a permanent copy of the programming instructions implementing various aspects of the present invention. The permanent copy of the programming instructions may be loaded into mass storage 1106 in the factory or in the field, as described earlier, through a distribution medium (not shown), or through communication interface 1110 from a distribution server (not shown). The constitution of these elements 1102-1112 are known, and accordingly will not be further described.

Conclusion and Epilogue

Thus, it can be seen from the above descriptions, a homogeneous method and system for monitoring heterogeneous nodes has been described. While the present invention has been described in terms of the above-described embodiments, the present invention is not limited to the embodiments described. As the present invention can be practiced with further modification and alteration within the spirit and scope of the appended claims, the description is to be regarded as illustrative instead of restrictive on the present invention.

What is claimed is:

1. A computerized method of monitoring a system or network comprising a plurality of heterogeneous nodes, the method comprising:
   defining multiple rules, each of the rules identifying criteria for detecting when the plurality of heterogeneous nodes on the system or network deviate from an authoritative state;
   defining multiple logical groupings of one or more heterogeneous nodes, the logical groupings determining where the rules are applied;
   defining multiple monitoring tasks, each monitoring task comprising applying at least one of the rules to at least a subset of a logical grouping of heterogeneous nodes;
   executing the multiple monitoring tasks; and
   in response to detecting a heterogeneous node deviating from the authoritative state, applying a remediation response wherein the remediation response is capable of both updating the authoritative state of the heterogeneous node and restoring the authoritative state of the heterogeneous node;
   wherein the one or more monitoring tasks are scheduled for opportunistic execution at a future date by an available one of the heterogeneous nodes.

2. The computerized method of claim 1, wherein the remediation response is an automatic remediation response.

3. The computerized method of claim 1, wherein the plurality of heterogeneous nodes comprise one of an active node-type or a passive node-type.

4. The computerized method of claim 3, wherein the one or more monitoring tasks are executed by an active node-type node.

5. The computerized method of claim 3, wherein the active node-types comprise at least one of a server, desktop computer, laptop computer, set-top box, PDA and a cell phone.

6. The computerized method of claim 3, wherein the passive node types comprise at least one of a router, a switch, a sensor, a file, a directory, and a network port.

7. An apparatus comprising:
   at least one processor operatively coupled to a storage medium;
   the storage medium having programming instructions stored therein, which, when executed, operate to:
   define multiple rules, each of the rules identifying criteria for detecting when a heterogeneous node on a system or network comprising a plurality of heterogeneous nodes deviates from an authoritative state;
   define multiple logical groupings of one or more heterogeneous nodes, the logical groupings determining where the rules are applied;
   define multiple monitoring tasks, each monitoring task comprising applying at least one of the rules to at least a subset of a logical grouping of heterogeneous nodes;
   execute the multiple monitoring tasks; and
   in response to detection of the heterogeneous node deviating from the authoritative state, apply a remediation response wherein the remediation response is capable of both updating the authoritative state of the heterogeneous node and restoring the authoritative state of the heterogeneous node;
   wherein the monitoring tasks are scheduled for opportunistic execution at a future date by an available one of the one or more nodes.

8. The apparatus of claim 7 wherein the remediation response is an automatic remediation response.

9. The apparatus of claim 7, wherein the plurality of nodes comprise one of an active node-type or a passive node-type.

10. The apparatus of claim 9, wherein the monitoring tasks are executed by an active node-type node.

11. The apparatus of claim 9, wherein the active node-types comprise at least one of a server, desktop computer, laptop computer, set-top box, PDA and a cell phone.

12. The apparatus of claim 9, wherein the passive node types comprise at least one of a router, a switch, a sensor, a file, a directory, and a network port.

13. A computerized method of monitoring a system or network comprising a plurality of heterogeneous nodes, the method comprising:
   defining multiple rules, each of the rules identifying criteria for detecting when the plurality of heterogeneous nodes on the system or network deviate from an authoritative state;
   defining multiple logical groupings of one or more heterogeneous nodes, the logical groupings determining where the rules are applied;
   defining multiple monitoring tasks, each monitoring task comprising applying at least one of the rules to at least a subset of a logical grouping of heterogeneous nodes;
   executing the multiple monitoring tasks; and
   in response to detecting a heterogeneous node deviating from the authoritative state, applying a remediation response wherein the remediation response is capable of both updating the authoritative state of the heterogeneous node and restoring the authoritative state of the heterogeneous node;
   wherein the one or more monitoring tasks are scheduled for execution by an identified one of the heterogeneous nodes.

14. An apparatus comprising:
   at least one processor operatively coupled to a storage medium;
   the storage medium having programming instructions stored therein, which, when executed, operate to:
   define multiple rules, each of the rules identifying criteria for detecting when a heterogeneous node on a system or network comprising a plurality of heterogeneous nodes deviates from an authoritative state;
   define multiple logical groupings of one or more heterogeneous nodes, the logical groupings determining where the rules are applied;
   define multiple monitoring tasks, each monitoring task comprising applying at least one of the rules to at least a subset of a logical grouping of heterogeneous nodes;
   execute the multiple monitoring tasks; and
   in response to detection of the heterogeneous node deviating from the authoritative state, apply a remediation response wherein the remediation response is capable of both updating the authoritative state of the heterogeneous node and restoring the authoritative state of the heterogeneous node;
   wherein the monitoring tasks are scheduled for execution by an identified one of the heterogeneous nodes.

* * * * *